United States Patent [19]

Miyauchi et al.

[11] 3,749,821
[45] July 31, 1973

[54] SYSTEM FOR RECORDING AND REPRODUCING A PLURALITY OF SIGNALS

[76] Inventors: Sakae Miyauchi; Kazumitsu Tanaka; Shinji Takayanagi; Kenji Kawakami, all of Tokyo, Japan

[22] Filed: Aug. 24, 1971

[21] Appl. No.: 174,411

[30] Foreign Application Priority Data

| Aug. 27, 1970 | Japan | 45/75214 |
| Sept. 3, 1970 | Japan | 45/77308 |
| Mar. 31, 1971 | Japan | 46/19368 |
| Apr. 12, 1971 | Japan | 46/22932 |
| Apr. 14, 1971 | Japan | 46/23558 |
| Apr. 14, 1971 | Japan | 46/23559 |
| Apr. 23, 1971 | Japan | 46/26489 |
| May 21, 1971 | Japan | 46/134481 |

[52] U.S. Cl. ........................ 178/5.2 D, 178/5.4 CD
[51] Int. Cl. .............................................. H04n 9/02
[58] Field of Search ................. 178/5.2, 5.2 D, 5.4, 178/5.4 CD

[56] References Cited

UNITED STATES PATENTS

| 3,459,885 | 8/1969 | Goldmark et al. | 178/5.4 CD |
| 3,535,992 | 10/1970 | Goldmark et al. | 178/5.2 D |
| 3,591,268 | 7/1971 | Neale | 178/5.2 D |

Primary Examiner—Richard Murray
Attorney—John M. Webb

[57] ABSTRACT

A system for recording a plurality of signals (e.g., the I and Q chroma signals in color television) in monochrome on a radiant energy sensitive recording medium by intermittently sampling in turn the signals to be recorded after having brought about a difference of intensity to the said signals and by modulating the intensity of periodically scanning radiation energy beam by means of the sampled signals.

26 Claims, 13 Drawing Figures

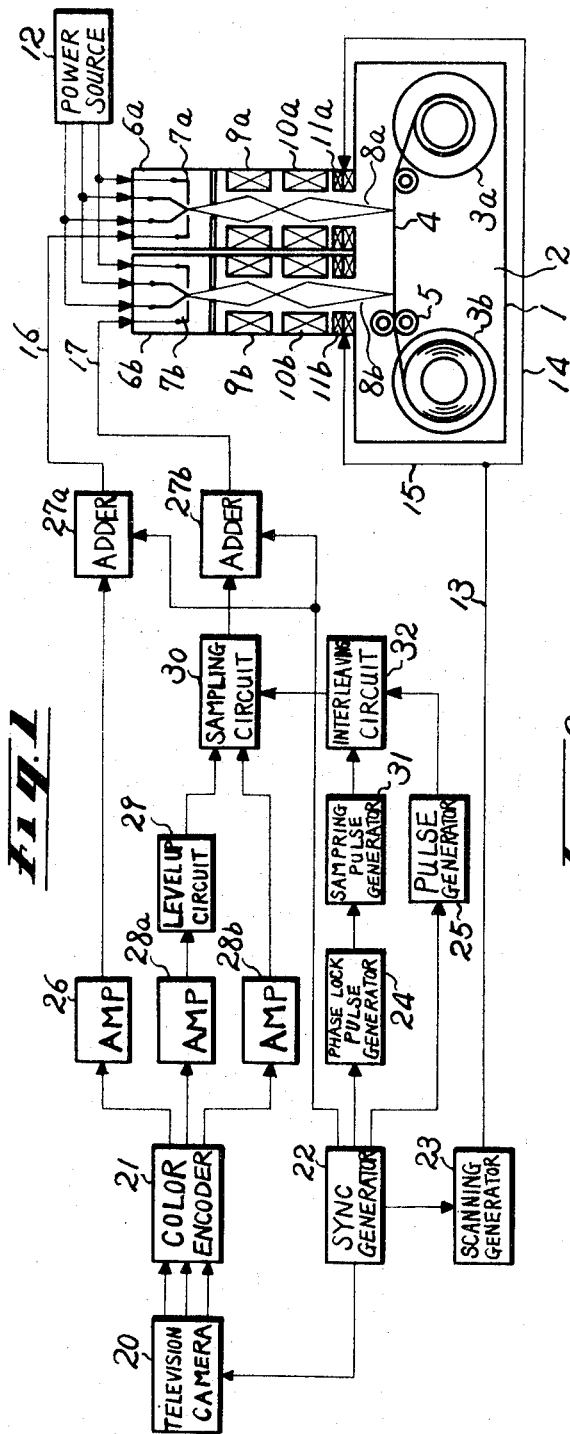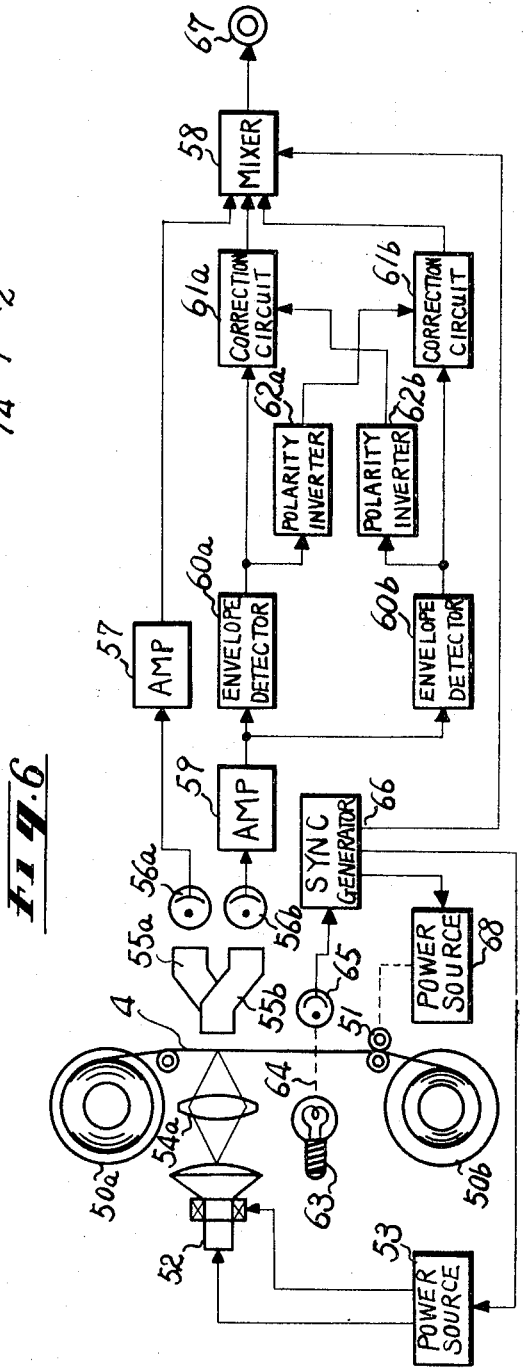

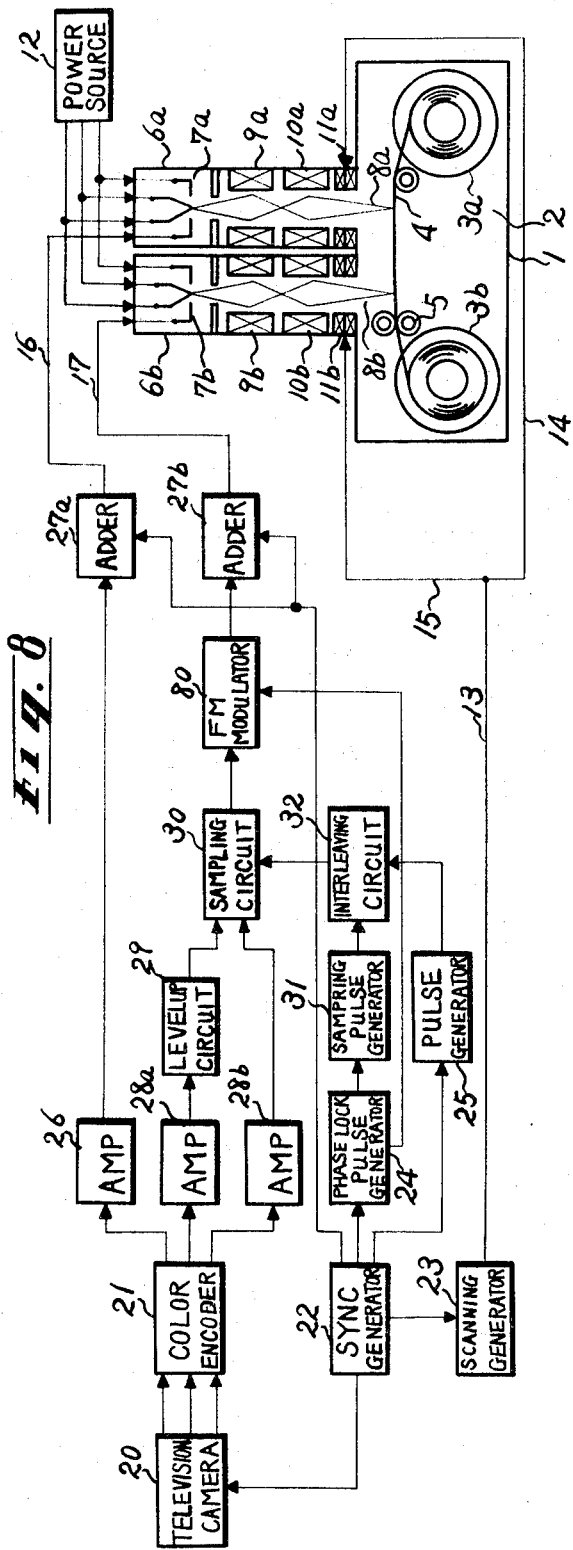
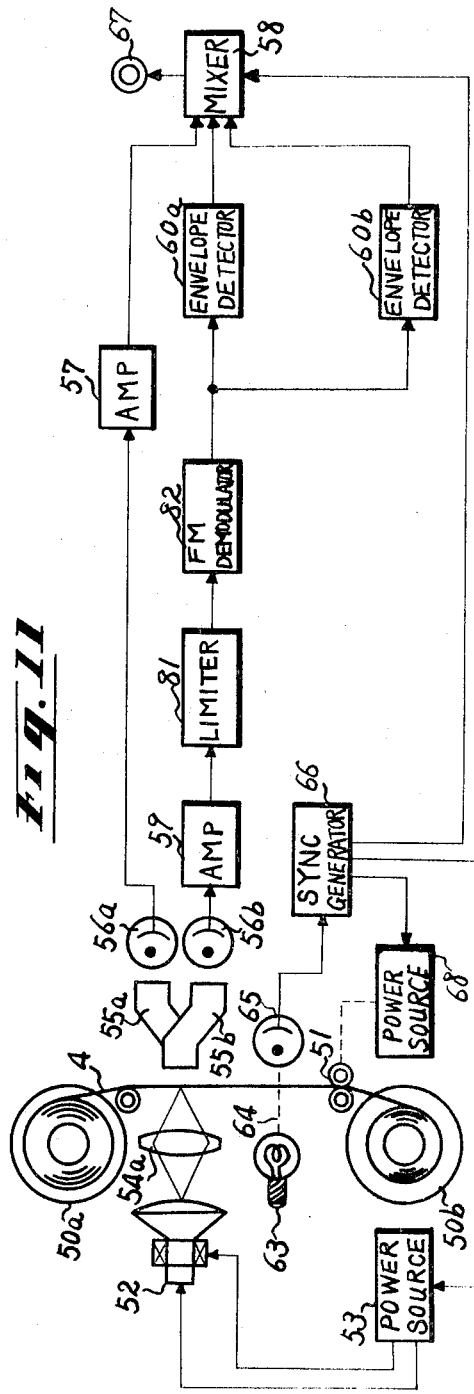

SYSTEM FOR RECORDING AND REPRODUCING A PLURALITY OF SIGNALS

This invention relates to a total new system of video tape recording and reproducing. More particularly, this invention relates to methods and apparatus for recording a plurality of color television signals in monochrome, on a radiant energy sensitive recording medium, to the medium for carrying a plurality of signals in monochrome and to an apparatus for reproducing a plurality of the aforesaid signals out of the aforesaid medium.

THE PRIOR ART

The recording of color television picture signals in monochrome is well known on such a recording medium as photographic film sensitive to radiant energy such as electron beams or light beams. In this system the color picture information is divided into a brightness signal and two kinds of color signals, such as the signals of I and Q in the NTSC system.

The brightness signal is recorded as it is while the two kinds of the chroma signals, I and Q, modulate the amplitude and/or the phase (frequency) of one kind or two kinds of carrier wave or waves which change or changes in a form of a sine curve so that the said modulated carrier wave is recorded.

In such a prior art system, however, an accurate reproduction of original picture information cannot be secured because the modulated carrier wave of an accurate frequency cannot be reproduced unless recorded lines are accurately tracked in producing color signals.

To eliminate this defect, another prior system provides for recording a reference carrier wave having a subharmonic relation to the frequency of the modulated carrier wave with the modulated carrier wave superimposed. Also, the prior system provides for aligning the phase of each carrier wave at right angles to the horizontal scanning direction of the electron beam over the recording medium in the electron beam recorder by making the frequency of each carrier wave an integral multiple of the horizontal scanning frequency of the beam for recording.

In such a system, however, the size of a reproducing apparatus is enlarged because circuits are required for extracting a reference carrier wave from the signal reproduced in a detector and for multiplying (or dividing) the said reference carrier wave in frequency.

Moreover, in such a prior system an accurate reproduction of original picture information cannot be secured in that it is difficult to multiply or divide the said reference carrier wave frequency accurately because the frequency of the reference carrier wave in a reproducing signal changes irregularly as the scanning speed of the reproducing beam changes. Hence, that color errors occur. In such a prior system, furthermore, if the frequency of the carrier wave changes during recording the phase of the said carrier wave cannot be aligned at right angles to the horizontal scanning direction of the beam for recording on a recording medium. As a result, it is necessary to track the recorded lines accurately during reproduction.

BRIEF DESCRIPTION

According to this invention, there is provided a novel method and system for multiple signal recording and reproducing useful for color television. For example, the video portion of a color television signal actually comprises three signals, the intensity signals and the chroma signals I and Q. In this system the intensity signal is recorded on one side of the tape by one electron beam recorder and the chroma signals on the other side by another recorder in a plurality of spaced side-by-side frames. The chroma frame comprises interleaved I and Q portions. According to this invention, the I signal, for example, has added thereto a fixed intensity signal such that the critical values of the I and Q signal will not overlap. The I and Q signals are then recorded transversely in transversely spaced portions within each frame. These portions are controlled by sampling pulses of frequency less than the scan frequency of the electron beam. The sample pulses are controlled to align the phases of the sampling pulse for each scan thereby providing the transversely spaced portions within the frame. Preferably, succeeding frames of chroma signals reverse the sequence of I and Q signals within the frame. According to a preferred embodiment, the I and Q signals are converted to FM signals prior to recording.

This novel tape may then be used to reproduce the intensity; I and Q signals by an apparatus that separately scans the intensity and chroma frames. The chroma signals may be separated by use of their overall different intensities. (In the embodiment where the chroma signals are FM modulated before recording they must be demodulated prior to separation.) Preferably, the separation of the two chroma signals is accomplished by two circuits, one of which is sensitive to the upper envelope of the combined signal and the other sensitive to the lower envelope.

An object of the present invention is to provide methods and apparatus for recording a plurality of signals to enable accurate reproduction thereof.

Another object of the invention is to provide a medium for carrying a plurality of recorded signals that may be accurately reproduced.

DETAILED DESCRIPTION

A further object of the invention is to provide a reproducing apparatus for reproducing a plurality of signals which can reproduce themselves accurately by means of a simple apparatus.

These and other objects and features of this invention will be better understood upon consideration of the following detailed description and the accompanying drawings in which:

FIG. 1 is a block diagram showing an apparatus for recording color television signals in monochrome on a radiant energy sensitive recording medium in one embodiment of the invention;

Figures 3A, 3B:
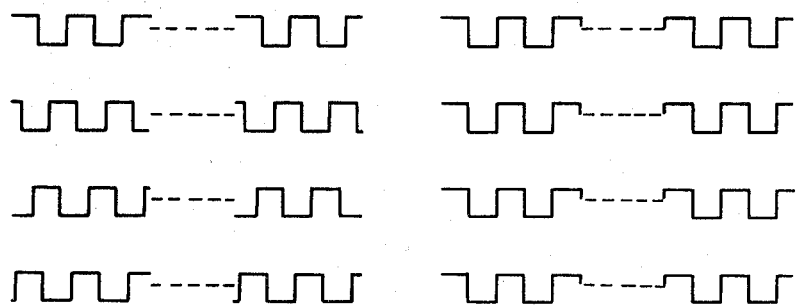
Figure 4:
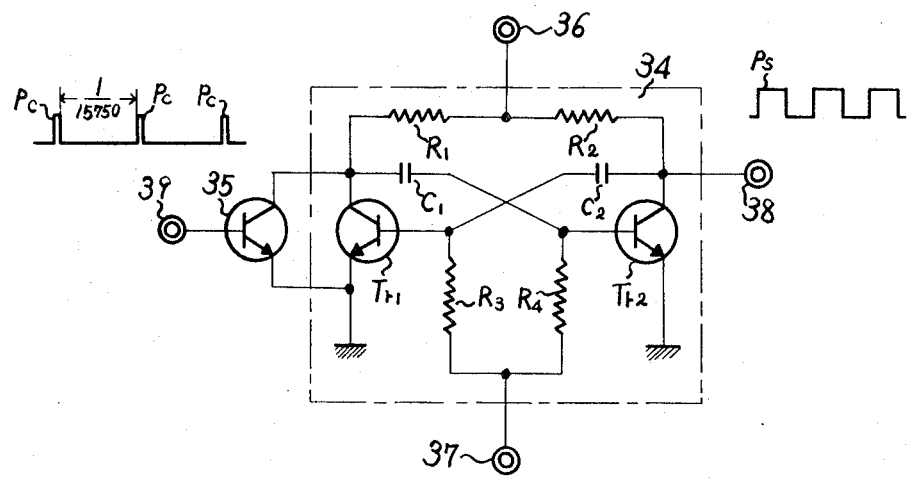
Figure 5:
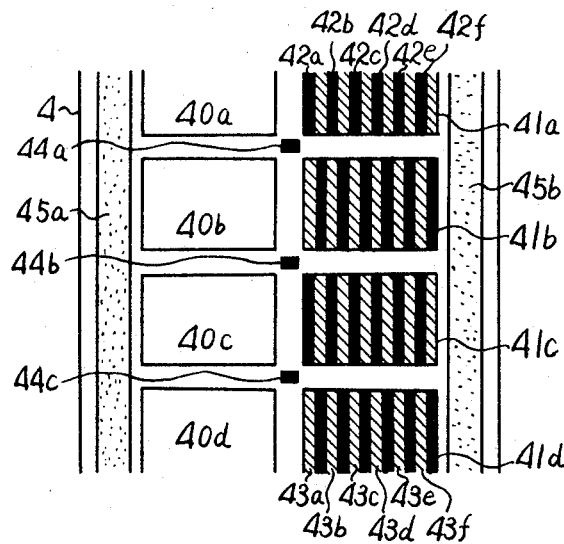
Figure 7:
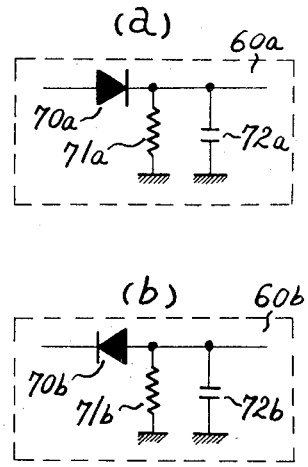
Figure 9:
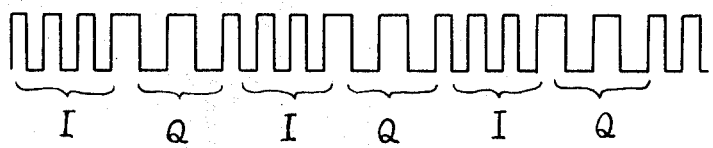
Figure 10:
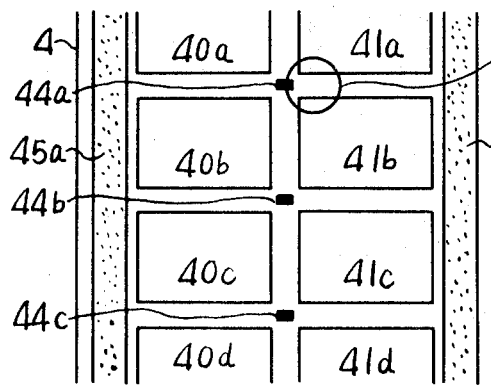
Figure 10:
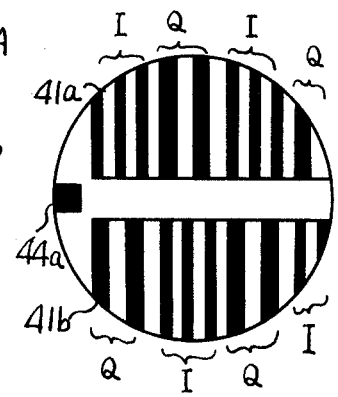

FIGS. 3(a) and 3(b) are diagrams showing the phase relation of the sampling pulse for sampling two kinds of color signals alternately;

FIG. 4 is an embodiment of a sampling pulse generator which is used in the apparatus shown in FIG. 1;

FIG. 5 is a schematic illustration showing a portion of a medium whereon signals are recorded by the apparatus shown in FIG. 1;

FIG. 6 is a block diagram showing an embodiment of an apparatus for reproducing the color television signals recorded on the recording medium shown in FIG. 5;

FIG. 7 is an embodiment of a detector used in the apparatus shown in FIG. 6;

FIG. 8 is a block diagram showing an embodiment of another apparatus for recording color television signals in monochrome on a radiant energy sensitive recording medium;

FIG. 9 is a diagram showing the shape of an actually recorded signal wherein two kinds of color signals, I and Q, are converted into signals to be recorded by the apparatus in FIG. 8;

FIG. 10(a) is a schematic illustration showing a portion of a medium whereon signals are recorded by the apparatus in FIG. 8;

FIG. 10(b) is an enlarged sectional view of portion A of the recording medium shown in FIG. 10(a); and, FIG. 11 is a block diagram showing an embodiment of an apparatus for reproducing color television signals recorded on the recording medium shown in FIG. 10(a).

RECORDING

Referring now to the drawings and more particularly to FIG. 1, an electron beam recorder 1 is exhausted down to low pressure by evacuating pumps which is not shown in the drawing. In recording chamber 2 of the recorder 1, supply reel 3a and take-up reel 3b are bridged by a recording medium 4, which is sensitive to an electron beam, (e.g., as a photography film wound up on reels 3a and 3b) and motor-driven mechanism 5 which moves the said recording medium 4 continuously or intermittently. In this embodiment, the description shall concern the cases where in such a continually motor-driven mechanism as a capstan is employed for the sake of convenience. Columns 6a and 6b contain electron guns, electron lenses 9a and 9b as well as 10a and 10b, condensing electron beams 8a and 8b emitted from the said electron guns on the recording medium 4. Deflecting means 11a and 11b scan the electron beams 8a and 8b periodically in the traverse direction of the recording medium 4. The electron gun power source 12 not only supplies heating electric current to the cathodes in electron guns 7a and 7b but also is impressed with negative high voltage and with constant bias voltage. When picture information signals, as will be described later, are supplied to a control electrode 7a and 7b in each electron gun, generates electron beams 8a and 8b corresponding to the intensity of the signals. Each of the columns for generating electron beams 6a and 6 b is shown as if electron beams 8a and 8b emitted from the respective columns irradiate positions spaced longitudinally on recording medium 4, but in reality they are arranged so that the electron beams emitted from respective columns may irradiate positions spaced transversely on recording medium 4 and a picture information signal may be recorded on different positions transversely on the recording medium by electron beams 8a and 8b emitted from the respective columns.

Synchronizing signal generator 22 generates horizontal synchronizing signals, vertical synchronizing signals and blanking signals having a frequency, for example, of 15.75 kHz and 60 Hz. Among the said signals, the horizontal synchronizing signals are supplied to horizontal scanning signal generator 23 and phase lock pulse generator 24. Horizontal scanning signal generator 23 generates horizontal scanning signals with a constant frequency of 15.75 kHz for scanning electron beams 8a and 8b transversely on recording medium 4 on the basis of the input signals. The said horizontal scanning signals are supplied to the said deflecting means 11a and 11b through conductors 13, 14 and 15. On the other hand, the vertical scanning signals are supplied to pulse generator 25 to be described later. Further, blanking signals are supplied to adders 27a and 27b.

A color picture information signal generator 20, such as a television camera, operates on the basis of the signals from the aforesaid synchronizing signal generator 22 and generates signals, for example, in red, blue and green corresponding to the colors of an original picture. The said respective signals are converted into a brightness signal (to be abbreviated as Y signal hereafter) and two kinds of chroma signals, I and Q or R-Y and B-Y at encoder 21. The Y signal is supplied to adder 27a through amplifier 26 and after having been added to the blanking signals at the said adder, it is supplied to electron gun 7a of column 6a through conductor 16. The intensity of electron beam 8a emitted from the said electron gun 7a is controlled by the signals supplied from adder 27a. On recording medium 4, therefore, frames 40a, 40b, 40c, . . . of the brightness signal are, in turn, formed by electron beam 8a, as is shown in FIG. 5.

Figure 2:
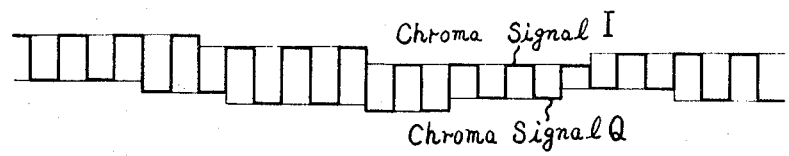
FIG. 2 is a diagram showing the shape of an actually recorded signal, wherein two kinds of color signals to be recorded, I and Q are converted into signals to be recorded by the apparatus in FIG. 1.

Signal I, one of the two kinds of the chroma signals I and Q, generated by the aforesaid encoder 21 is supplied to one of the input terminals of sampling circuit 30 through level-up circuit 29 after having been amplified by amplifier 28a. On the other hand, the other chroma signal Q is supplied to the other input terminal of sampling circuit 30 through amplifier 28b. In level-up circuit 29, a constant signal above the maximum variation intensity of the respective chroma signals is added to the chroma signal I in order to distinguish chroma signals I and Q as the difference of the signal intensity. In sampling circuit 30 a sampling pulse of 1.5 MHz, for example, which is generated by sampling pulse generator 31, is supplied through interleaving circuit 32. In the said sampling circuit 30, the aforesaid two chroma signal types I and Q, are supplied to adder 27b, being switched over in turn by the aforesaid sampling pulse. The output signal from the said adder 27b is supplied to electron gun 7b of the column for generating electron beams 6b through conductor 17 and for controlling the intensity of electron beam 8b emitted from the said electron gun. The signal supplied from sampling circuit 30 to adder 27b becomes a signal which is composed of chroma signals I and Q, in turn having a difference in the signal intensity, as is shown in FIG. 2, and which is formed substantially by modulating the upper amplitude of a rectangular wave by chroma signal I and the lower amplitude by chroma signal Q, that is, a signal wherein the upper envelope shows chroma signal I and the lower envelope shows chroma signal Q. On recording medium 4, accordingly, frames 41a, 41b, 41c, . . . of the chroma signals are formed in turn by electron beam 8b, as is shown in FIG. 5, and within each of the frames, two kinds of chroma signals are in turn recorded transversely to the recording medium. In addition, the recording density of each recording portion differs according to signal intensity and kind of signal.

In this apparatus, the phase of a sampling pulse of 1.5MHz generated by sampling pulse generator 31 is controlled by the phase control pulse generated by phase lock pulse generator 24 operating on the basis of the horizontal synchronizing signal so that the phases at the beginning of horizontal scanning of the electron beam for recording 8b may always be the same. That is to say, when the frequency of the sampling pulse, namely, the switching frequency of chroma signals I and Q is not an integral multiple of the horizontal scanning frequency of electron beams 8a and 8b, the phases are not aligned from scanning line to scanning line, as is shown in FIG. 3a, and as a result of it, the recording portions of signal I and signal Q on the recording medium are not aligned from scanning line to scanning line, so that the recording line should accurately be tracked during reproduction. As is shown in FIG. 3b, however, if the phases are aligned, the recording portions of chroma signals I and Q will be aligned and, therefore, it will be unnecessary to track the recording line accurately during reproduction.

Referring to FIG. 4, in this apparatus, sampling pulse generator 31 may comprise transistor 35 provided on the side of transistor $Tr_1$ of a stable multivibrator 34 consisting of transistors $Tr_1$ and $Tr_2$, resistors $R_1$, $R_2$, $R_3$ and $R_4$, and capacitors $C_1$ and $C_2$ and a circuit connecting the emitters and the collectors of the said respective transistors $Tr_1$ and 35, respectively, is employed. In the said circuit, terminal 36 is connected to power source B, and terminal 37 is connected to a direct current power source circuit, neither of which is shown in the figure. When the value of each circuit element is determined, the frequency of the sampling pulse supplied from terminal 38 to interleaving circuit 32 can be controlled by varying the value of the voltage supplied to terminal 37. The phase control pulse generated by phase lock pulse generator 24 on the basis of the horizontal synchronizing signal has the same frequency as that of the horizontal synchronizing signal, namely, 15.75 kHz, as is indicated by the sign Pc in the figure, and if the said pulse is supplied from terminal 39 to the base of transistor 35, continuity between the emitter, and the collector of transistor $Tr_1$ will be established so that the level of the output signal from terminal 38 will forcibly be changed up to the reference level, and, henceforth, a predetermined rectangular wave $P_s$ will be generated from terminal 38. The phase of the output signal from terminal 38 is always controlled by the phase control pulse being supplied to the base of transistor 35, and as a result of it, the phase of the sampling pulse from scanning line to scanning line becomes approximately the same, as is shown in FIG. 3b. Therefore, recording portions 42a, 42b, 42c, . . . and 43a, 43b, 43c, . . . of chroma signals I and Q on recording medium 4 are aligned at right angles to the horizontal scanning direction of the electron beam for recording 8b within the respective frames 41a, 41b, 41c, . . . as is shown in FIG. 5, that is, longitudinally of the recording medium. In FIG. 5, in addition, the recording portions of signal I are indicated uniformly in black, while the recording portions of signal Q are indicated in shaded oblique lines. The density of the recording portions of each signal varies in accordance with the intensity of signals.

The sampling pulse of 1.5MHz generated in this way is supplied to interleaving circuit 32. The interleaving circuit inverts the phase of the aforesaid sampling pulse from field to field and supplies it to sampling circuit 30. The signal carrying the instruction to invert is provided by pulse generators. Hence, the control signal of 60 Hz based on the vertical synchronizing signal of 60 Hz generated by synchronizing signal generator 22, is supplied to interleaving circuit 32. If the phase of the sampling pulse is inverted from field to field in a television signal, the sampling sequence of the two kinds of the chroma signals in sampling circuit 30 will be reversed from field to field and, as a result of it, the two kinds of chroma signals will be recorded so that the recording portions of each signal will be recorded so that the recording portions of each signal may be inverted from frame to frame, as is shown in FIG. 5. In other words, the recording portions of signal I in frame 41b come to positions corresponding to the recording portions of signal Q in frame 41a, while the recording portions of signal Q in frame 41b come to positions corresponding to the recording portions of signal I in frame 41a. Although there may be a harmful effect due to the portions failing in signal I and signal Q in a reproduced picture in a field, the harmful effect due to the aforesaid failing portions is rejected by the after image effect of the eye from a picture which is reproduced continuously out of the series of fields. As the said interleaving circuit 32 may invert the phase by 180 degrees at a frequency of 60 Hz, synchronizing the sampling pulse with the vertical synchronizing signal, a phase inverter employing a delay circuit may be used.

A medium whereon record is made by such an apparatus has both frames 40a, 40b, 40c, . . . of the brightness signal by the electron beam 8a and frames 41a, 41b, 41c, . . . of the chroma signals by the electron beam for recording 8b longitudinally of recording medium 4, as is shown in FIG. 5. As two kinds of chroma signals, I and Q, modulate the electron beam for recording 8b during a horizontal scanning period within frames 41a, 41b, 41c, . . . of the chroma signals, the two kinds of chroma signals, I and Q, are recorded in turn transversely of recording medium 4. Recording portions 42a, 42b, 42c, . . . and 43a, 43b, 43c, . . . of the said respective chroma signals are controlled so that the phases of the sampling pulse at the beginning of the horizontal scanning of electron beam 8b may always be the same, they are nearly aligned longitudinally of recording medium 4. As the phases of the sampling pulse are inverted from field to field, the recording portions of the respective chroma signals are recorded inversely from frame to frame. Furthermore, the recording density of the chroma signals in each frame not only varies according to each signal intensity, but also differs greatly according to the kind of the signal because a direct current component is added to the chroma signal I.

In addition, 44a, 44b, 44c, . . . in FIG. 5 are vertical synchronizing indicia, and 45a and 45b indicate sound tracks. These are formed in the conventional manner.

REPRODUCING

FIG. 6 is an embodiment of an apparatus for reproducing picture information out of the recording medium shown in FIG. 5. In the figure, 50a and 50b are a supply reel and a take-up reel, respectively, whereon the recording medium is wound up, and recording medium 4, which bridges the said reels, is continuously moved by a motor-driven mechanism 51, such as a capstan. 52 is a cathode ray tube controlled by power source 53; the scanning electron beam in the said cathode ray tube has a constant intensity and is scanned on one direction at the same frequency as that of the electron beams 8a and 8b in the apparatus shown in FIG. 1, namely, at 15.75 kHz. The rays generated on the fluorescent screen of the said cathode ray tube 52 are focused on recording medium 4 by condenser lenses 54a and 54b (54b is not shown in the figure). The said rays transversely scan recording medium 4 accompanying the scanning of the scanning electron beams in cathode ray tube 52. In this case, the rays transmitted through lens 54a scan the inside of the frame (refer to FIG. 5) of the brightness signal, while the rays transmitted through lens 54b scan the inside of the frame of the chroma signals. As the respective rays are transmitted through the recording medium, their intensity (the quantity of light) varies according to the recording density of a transmission portion. Thus, the light transmitted through recording medium 4 is irradiated on photomultipliers 56a and 56b through respective light guides 55a and 55b, and is converted into an electric signal corresponding to the intensity of light by the said photomultipliers. The output signal from photomultiplier 56a corresponds to the brightness signal in the case of recording, and the said signal is supplied to mixer 58 through amplifier 57. On the other hand, the output signal from photomultiplier 56b is similar to the signal as shown in FIG. 2, though there is a variation, more or less, according to the size of the spot of electron beam 8b (refer to FIG. 1) and/or the beam for reproduction. If the spot size of electron beam 8b or the beam for reproduction is enlarged, the reproducing signal varies in a form of sine wave. The said reproducing signal is passed through amplifier 59 and then supplied to envelope detectors 60a and 60b.

Referring to FIGS. 7a and 7b, the envelope detectors may comprise circuits consisting of diodes 70a and 70b, resistors 71a and 71b and capacitors 72a and 72b, the diodes being connected inversely, are employed in this apparatus. Therefore, detector 60a detects the upper envelope of the reproducing signal, while detector 60b detects the lower envelope. The upper envelope of the reproducing signal is chroma signal I, while the lower envelope is chroma signal Q. Chroma signals I and Q reproduced in this way are supplied to correction circuits 61a and 61b, respectively. In correction circuit 61a, part of chroma signal Q from detector 60b *is supplied through polarity inverter 62b* in order to reject the component of the other chroma signal, Q, which is mixed into the reproduced chroma signal, I, owing to the cross polarization phenomenon. In correction circuit 61b, on the othe hand, chroma signal I is supplied through polarity inverter 62a, for the same reason. Polarity inverters 62a and 62b not only invert the amplitudes of the respective chroma signals into any amplitude, but also supply them to correction circuits 61a and 61b after having inverted the polarity. The output signals of the said correction circuits 61a and 61b are supplied to mixer 58. In order to reproduce vertical synchronizing indicia 44a, 44b, 44c, . . . on recording medium 4 shown in FIG. 5, continuous light beam 64 emitted from lamp 63 is irradiated on the nearly central section of recording medium 4, and the transmitted light is supplied to synchronizing signal generator 66 after it has been converted into an electric signal by photomultiplier 65. The signal supplied to synchronizing signal generator 66 has a frequency of 60 Hz. The said synchronizing signal generator 66 generates a vertical synchronizing signal and a horizontal synchronizing signal on the basis of the aforesaid signal of 60 Hz, and supplies the respective signals to mixer 58. In mixer 58, television signals to be supplied to a television image receiver are generated on the basis of all input signals and supplied to output terminal 67.

The vertical synchronizing signal and/or the horizontal synchronizing signal generated by synchronizing signal generator 66 controls the scanning frequency of the scanning electron beam in cathode ray tube 52, being supplied to power source 53 and power source 68 of the motor-driven mechanism 51 and, moreover, are also used for controlling the moving speed of recording medium 4 in power source 68.

THE OVERALL SYSTEM

Hence, according to this invention, two kinds of chroma signals are recorded. After one envelope of the carrier wave (having a higher frequency than the scanning frequency of electron beam 8b) has been modulated in accordance with one signal intensity and the other envelope has been modulated in accordance with the other signal intensity, the respective signals are in turn recorded on the recording medium and, moreover, the densities of the recording portions of the respective signals differ according to the kind of signal and the signal intensity. As a result, the respective signals can be distinguished by making use of the difference of the reproducing signal intensities at the time of reproduction. Hence, there is no danger of reproducing the respective signals erroneously. In addition, as the respective signals can be reproduced only by detecting the reproduced signal by means of a simple detector circuit, in particular, by detecting the envelopes on both sides by means of envelope detectors, the reproducing apparatus is exceedingly simplified as compared with the conventional apparatus which requires a synchronizing detector circuit.

Further, as the phases of the sampling pulse at the beginning of horizontal scanning of electron beam 8b are forcibly aligned, the recording portions of the respective signals on the recording medium are nearly aligned longitudinally of the recording medium and, as a result, it is unnecessary to track the recording line accurately during reproduction. The recorded signals can accurately be tracked even though the spot size of the reproducing beam on the recording medium changes.

FM MODULATION OF CHROMA SIGNALS: REPRODUCING

The apparatus shown in FIG. 8 is an embodiment of the other apparatus for recording color television signals in monochrome on a radiant energy sensitive recording medium which is provided with FM modulator 80 between the sampling circuit 30 and the adder 27b. The said modulator 80 generates a carrier wave having a frequency corresponding to the intensity of the signal (which is shown in FIG. 2) supplied from sampling circuit 30. In the said carrier wave the I signal part and the Q signal part occur in turn as is shown in FIG. 9, as signal I and signal Q are supplied in turn from sampling circuit 30 to FM modulator 80. Moreover, as the frequency of the I signal part contains the signal component added by level-up circuit 29, it becomes a higher frequency than the frequency of the Q signal part. In the case of this apparatus, the frequency of the I signal part varies within the range of 5.5 to 6.5 MHz in accordance with the intensity of signal I, while the frequency of the Q signal part varies within the range of 4.4 to 5.4 MHz in accordance with the intensity of signal Q. The difference of approximately 1 MHz between the frequency of the I signal part and the frequency of the Q signal part is based on the signal component added to signal I by level-up circuit 29.

As FM modulator 80 is used in this apparatus, such a modulator generates a carrier wave wherein the phases of the carrier wave at the beginning of horizontal scanning of electron beam 8b are always the same, in order to eliminate the necessity of tracking accurately the recording line during reproduction. As such a modulator, a circuit (refer to FIG. 4) which is employed in sampling pulse generator 31 can be used. That is to say, the signals from sampling circuit 30 are supplied to terminal 37 of the circuit in FIG. 4, while phase lock pulse $P_c$ having a frequency of 15.75 kHz, generated by pulse generator 24, is supplied to terminal 39. In this way, a pulse having a frequency corresponding to the signal intensity supplied to terminal 37 is generated from terminal 38 connected to adder 27b. The said pulse is controlled by the phase lock pulse supplied to terminal 39 so that the phases at the beginning of horizontal scanning of electron beam 8b may always be the same.

The medium whereon a recording is made by such an apparatus is shown in FIG. 10a and in FIG. 10b. The said medium 4 has both frames 40a, 40b, 40c, ... of the brightness signal by electron beam 8a and frames 41a, 41b, 41c, ... of the two kinds of chroma signals, I and Q, in the same way as the medium (refer to FIG. 5) whereon a recording is made by the apparatus shown in FIG. 1. In frames 41a, 41b, 41c, ... of the two kinds of chroma signals, I and Q, carrier waves are recorded as many lights and shades transversely of recording medium 4, as is shown in FIG. 10b. In FIG. 10b the half frequency of the carrier wave is shown in white while the other half frequency is shown in black. Moreover, as the two kinds of chroma signals I and Q, substantially modulate electron beam 8b, in turn, they occur in turn transversely of recording medium 4, and as the phases of the sampling pulse are always controlled, the recording portions of the respective signals are aligned longitudinally of the recording medium. Further, the intervals between light and shade by the carrier wave in the respective recording portions not only differ greatly between the I signal part and the Q signal part but also differ according to the respective signal intensity. Furthermore, the lights and shades by the carrier wave are nearly aligned longitudnally of recording medium 4, becuase the phases of th carrier wave at the beginning of the horizontal scanning of electron beam 8b are always controlled so as to be the same.

FM MODULATION OF CHROMA SIGNALS: REPRODUCING

The reproducing apparatus which is shown in FIG. 11 is used in order to reproduce color television signals out of recording medium 4 shown in FIGS. 10a and 10b. The said reproducing apparatus differs from the apparatus shown in FIG. 6 in that limiter 81 for converting the reproducing signal at photomultiplier 56 into a signal with a constant amplitude and FM demodulator 82 for demodulating the frequency of the output signal of the said limiter are provided between amplifier 59 and envelope detectors 60a and 60b.

Furthermore, since the cross polarization phenomenon does not occur in the process of reproducing the FM signals recorded on the recording medium, correction circuits 61a and 61b and polarity inverters 62a and 62b included in the apparatus shown in FIG. 6 are omitted from this apparatus. In such an apparatus, therefore, the signal supplied from limiter 81 to FM demodulator 82 is the signal shown in FIG. 9, and the signal shown in FIG. 2, which is obtained by demodulating the said signal by FM demodulator 82, is supplied to envelope detectors 60a and 60b.

The signals supplied from mixer 58 to terminal 67 are the color television signals supplied to a televison image receiver or the like, in the same way as in the apparatus shown in FIG. 6.

One of the advantages of recording color television signals in the type of the frequency modulation of a carrier wave as mentioned above is that noise is not mixed into a reproducing signal.

Having thus described our invention with the detail and particularity as required by the Patent Laws, what is desired protected by Letters Patent is set forth in the following claims.

We claim:
1. A method of recording a plurality of signals in monochrome on a recording medium sensitive to radiant energy comprising the steps for:
   A. periodically scanning a radiant energy beam transversely on the recording medium;
   B. intermittently sampling a plurality of signals to be recorded in turn by means of a sampling pulse with a frequency higher than the scanning frequency of the beam;
   C. adding different fixed intensity levels to said plurality of signals; and,
   D. modulating the intensity of the aforesaid electron beam by the added signal of step (C).

2. A method according to claim 1 comprising the step of aligning the phases of the sampling pulse from scanning to scanning.

3. A method according to claim 1 wherein the plurality of signals comprise two kinds of color television chroma signals wherein a number of scan lines comprise one picture frame comprising the step of reversing the sequence of sampling the said two kinds of signals from field to field.

4. A method of recording a plurality of signals in monochrome on a recording medium sensitive to radiant energy comprising the steps for:
   A. periodically scanning a radiant energy beam transversely on the recording medium;
   B. intermittently sampling a plurality of signals to be recorded in turn by means of a sampling pulse with a frequency higher than the scanning frequency of the beam;
   C. adding different fixed intensity levels to said plurality of signals;
   D. converting the added signal of step (C) into a carrier wave whereof the frequency or the phase varies in accordance with the intensity thereof; and,
   E. modulating the intensity of the aforesaid electron beam by means of the said carrier wave.

5. A method according to claim 4 comprising the step of aligning the phases of the sampling pulse from scanning to scanning.

6. A method according to claim 4 comprising the step of aligning the phases of the carrier wave at the beginning of each scanning.

7. A method according to claim 4 wherein the plurality of signals comprise two kinds of color television chroma signals wherein a number of scan lines comprise one picture frame comprising the step of reversing the sequence of sampling the said two kinds of signals from field to field.

8. Apparatus for recording a plurality of signals in monochrome on a recording medium sensitive to radiant energy comprising:
   A. means for moving the recording medium longitudinally thereof;
   B. means for generating a radiant energy beam;
   C. means for scanning the aforesaid beam transversely on the recording medium periodically;
   D. means for adding different intensity levels to the plurality of signals to be recorded;
   E. means for sampling signals provided with different intensity levels by the adding means at a frequency higher than the scanning frequency of the aforesaid beam; and,
   F. means for supplying the sampled signals to the aforesaid beam generating means to modulate the intensity of the beam.

9. Apparatus according to claim 8 comprising a sampling pulse generating means which generates a sampling pulse with the same phases from scanning to scanning of the aforesaid beam.

10. Apparatus according to claim 9 wherein the plurality of signals comprise two kinds of color televison chroma signals wherein a number of scan lines comprise one picture frame comprising means for reversing the sequence of sampling the said two kinds of signals from field to field.

11. Apparatus for recording a plurality of signals in monochrome on a recording medium sensitive to radiant energy comprising:
   A. means for moving the recording medium longitudinally;
   B. means for generating a radiant energy beam;
   C. means for scanning the aforesaid beam transversely on the recording medium periodically;
   D. means for adding different intensity levels to the plurality of signals to be recorded;
   E. means for sampling signals provided with different intensity levels by the adding means at a frequency higher than the scanning frequency of the aforesaid beam in turn;
   F. means for converting the sampled signals into carrier waves whereof frequency or phase varies in accordance with the intensity thereof; and,
   G. means for supplying the said carrier waves to the aforesaid beam generating means to modulate the inensity of the beam.

12. Apparatus according to claim 11 comprising a sampling pulse generating means which generates a sampling pulse with the same phases from scanning to scanning of the aforesaid beam.

13. Apparatus according to claim 11 wherein the means for converting the sampled signals into carrier waves, whereof frequency or phase varies in accordance with the intensity thereof, includes a means for making the phases of the said carrier waves the same at the beginning of every scanning of the aforesaid beam.

14. Apparatus according to claim 11 wherein the plurality of signals comprise two kinds of color television chroma signals wherein a number of scan lines comprise one picture frame comprising means for reversing the sequence of sampling the said two kinds of signals from field to field.

15. A recording medium carrying a plurality of dissimilar signals in monochrome comprising a plurality of longitudinally arranged frames wherein a plurality of dissimilar signals are in turn recorded transversely on the recording medium within each frame in spaced longitudinal relationship, the recorded densities of the recorded portions of the respective signals differing according to the kind and intensity of signal such that there exists no overlap of the said recorded densities for the signals of any two kinds.

16. A recording medium according to claim 15 wherein the the recording portions within each frame of a plurality of the aforesaid signals are substantially longitudinally aligned in respective frames.

17. A recording medium according to claim 15 wherein the positions of the recording portions of a plurality of the aforesaid signals in frames differ from frame to frame.

18. A recording medium carrying a plurality of dissimilar signals in monochrome comprising a plurality of longitudinally arranged frames wherein a plurality of signals are in turn recorded transversely on the recording medium within each frame, the said recording portions of the said respective signals consists of a plural number of light parts and shaded parts in the longitudinal direction, the intervals of light and shade in the aforesaid direction in the respective recording portions differing according to the kind and intensity of signal, such that there exists no overlap of the recorded densities for the signals of any two kinds.

19. A recording medium according to claim 18 wherein the recording portions of plurality of the aforesaid signals are nearly longitudinally aligned in respective frames.

20. A recording medium according to claim 18 wherein the light parts and shaded parts are nearly longitudinally aligned in respective recording portions.

21. A recording medium according to claim 18 wherein the positions of the recording portions of a plurality of the aforesaid signals in frames differ from frame to frame.

22. Apparatus for reproducing two kinds of signals from a recording medium wherein the aforesaid two kinds of signals are in turn recorded in one direction and the overall recording densities of the recording portions of the said respective signals differ according to the kind of a signal with a smaller variation in intensity carrying the information of the particular kind of signal comprising:
   A. means scanning the recording medium for producing signals whereof the envelopes on both sides vary from the recording medium;
   B. means for extracting one signal by detecting one envelope of the said reproducing signals; and,
   C. means for extracting the other signal by detecting the other envelope of the said reproducing signals.

23. Apparatus according to claim 22 having means for supplying one of the aforesaid extracted signals to the other signal and having inverted the plurality thereof to cancel the cross polarization phenomena.

24. Apparatus for reproducing a plurality of different kinds of signals from a recording medium carrying a plurality of signals in monochrome comprising a plurality of longitudinally arranged frames wherein a plurality of signals are in turn recorded transversely on the recording medium within each frame in spaced longitudinal relationship, the recording densities of the recording portions of the respective signals differing according to the kind and intensity of signal without overlapping the variation ranges of the said recording densities comprising:

A. means for scanning the recording medium for producing signals whose intensity varies in accordance with the recording density of the recording medium; and, B. means for extracting and separating a plural number of the aforesaid signals by use of the overall level difference of the intensities of the said reproduced signals of different kinds.

25. Apparatus for reproducing a plurality of signals from a recording medium carrying a plurality of signals in monochrome comprising a plurality of longitudinally arranged frames wherein a plurality of signals are in turn recorded transversely on the recording medium within each frame, the said recording portions of the said respective signals consisting of a plural number of light parts and shaded parts in the longitudinal direction, the intervals of light and shade in the aforesaid direction in the respective recording portions differing according to the kind and intensity of signal without overlapping the variation ranges of the said intervals comprising:

A. means for scanning the recording medium for producing from the recording medium signals whose frequencies or phases differ;

B. means for demodulating the said reproduced signals; and,

C. means for extracting and separating a plural number of the aforesaid signals by use of the level difference of the intensities of the said demodulated signals.

26. Reproducing apparatus according to claim 25 wherein the aforesaid extracting means comprises a means for determining one signal by detecting one envelope of the demodulated signal and a means for determining the other signal by detecting the other envelope of the demodulated signal.

* * * * *

UNITED STATES PATENT OFFICE
CERTIFICATE OF CORRECTION

Patent No. 3,749,821          Dated   July 31, 1973

Inventor(s)   Sakae Miyauchi et al.

It is certified that error appears in the above-identified patent and that said Letters Patent are hereby corrected as shown below:

On the first page of the patent after the line listing the inventors insert the following:

--Assignee: Nihon Denshi Kabushiki Kaisha--

Under the heading Foreign Application Priority Data insert the following in the next to the last line of the list:

--April 23, 1971 Japan 46/26490--.

--46/134481-- should read --46/34481--.

Signed and sealed this 27th day of November 1973.

(SEAL)
Attest:

EDWARD M. FLETCHER, JR.　　　　　　RENE D. TEGTMEYER
Attesting Officer　　　　　　　　　Acting Commissioner of Patents